April 5, 1966 F. S. C. BRANCO 3,244,954

TAPE TENSION MOTOR CONTROL CIRCUIT

Filed Jan. 30, 1962 2 Sheets-Sheet 1

INVENTOR:
Flavio S.C. Branco
By Smyth, Roston & Pavitt
Attorneys

TAPE TENSION MOTOR CONTROL CIRCUIT

Filed Jan. 30, 1962 2 Sheets-Sheet 2

INVENTOR:
Flavio S. C. Branco
By Smyth, Roston & Pavitt
Attorneys

United States Patent Office 3,244,954

Patented Apr. 5, 1966

3,244,954

TAPE TENSION MOTOR CONTROL CIRCUIT

Flavio S. C. Branco, Van Nuys, Calif., assignor to Minnesota Mining and Manufacturing, St. Paul, Minn., a corporation of Delaware Filed Jan. 30, 1962, Ser. No. 169,918
16 Claims. (Cl. 318—7)

This invention relates to an electrical system for regulating the tension in a movable medium, such as a tape.

In recent years, information has been recorded on tape for stroage and for subsequent reproduction from the tape. For example, video and audio information has been recorded on tapes for subsequent use. Information such as digital data obtained from computers and other scientific instruments has also been recorded on the tape for subsequent use.

In order to accurately record information on the medium such as a tape and reproduce information from the tape, the tension in the tape must be kept substantially constant. If the tension varies during portions of the recording or reproducing cycles, the tape medium may stretch on the tape reel. When the tape remains in this streached condition, it becomes permanently deformed and information on the tape is distored. Also, as the tension varies, the instantaneous speed of the tape medium varies to cause flutter in the system. It is, therefore, important to keep the tension on the tape at a constant value.

This has been accomplished with fair success in the past by using a first motor to drive the take-up reel receiving the tape at a speed to maintain the tension in the tape medium at a constant value. A second motor driving the pay-out reel is also varied in its speed to maintain the tension in the tape at the pay-out reel at a constant value. In this manner, both motors are varied independently to control the tension in the tape medium at their respective reels.

There are many variable factors which cause the tension in the tape to change at different instants of time from a particular value. For example, inaccuracies in the structure of the pay-out and take-up reels may affect the tape tension. As another example, the voltages applied to the motors can vary so as to produce corresponding variations in motor speed and, consequently, tape tension. The load on the motors can vary because of friction and because of variations in the amount of tape on the payout reel and the take-up reel. For example, at the beginning of the reproducing cycle, the pay-out reel is generally full and the take-up reel is empty. This condition continuously varies during the reproducing cycle as tape becomes wound on the take-up reel and as tape is unwound from the pay-out reel.

The above variable factors have created a need for a control system which is accurate, simple and fast acting. The prior art in responding to this need has developed fairly successful systems, but has not been able to completely solve the problem. For example, the prior art has utilized systems which produce a control signal having an amplitude representative of the magnitude of the error in tape tension from a particular value and having a polarity representative of the direction of deviation of tape tension from the particular value. The polarity of the signal is used to control the direction in which the motor coupled to the reel is operated. The amplitude of the signal determines the speed at which the motor coupled to the reel is operated.

Since the prior art system utilize control signals of both polarities, circuitry must be provided for the signals of both polarities. This results in two parallel control channels, and in order for the control system to operate properly, the channels must be identical. Furthermore, supply voltages of one polarity must be introduced to one of the channels and supply voltages of opposite polarity but of equal magnitude must be introduced to the other channel. If one channel is not balanced with respect to the other channel, either because of imbalances in its own constructiion or imbalances in the supply voltages, signals of different amplitudes for comparable tensions on both sides of the desired tape tension is produced. This creates an inaccuracy and leads to the control system hunting back and forth in an effort to find the proper tension.

This invention provides control signals all of the same polarity to eliminate the need for balanced circuitry and to eliminate the need for supply voltages of opposite polarities but of equal magnitudes. The invention allows the use of relatively simple circuitry since there is now no need for components for both positive and negative signals. The invention is accomplished by producing control signals having the same polarity whether the tension on the tape is above or below the particular value. This is accomplished by biasing the system so that signals of a first polarity but of an increasing amplitude are produced as the tension on the tape deviates in one direction from the particular value. Similarly, signals of the first polarity but of a decreasing amplitude are produced as the tension in the tape deviates in the opposite direction from the particular value. In this way, amplitudes of the signal above a particular null value indicate deviations in the tension on the tape in one direction and amplitudes of the signal below the particular value indicate deviations in the tension on the tape in the opposite direction. Signals on one side of the particular null value cause a reversing switch to operate in a first state and signals on the other side of the particular null value cause the reversing switch to operate in a second state. The reversing switch controls the polarity of the signals applied to the motor driving the pay-out reel so as to control the direction in which the motor is operated.

Since biasing the control signals provides lower amplitude signals for comparative tensions on one side of the desired tension than on the other, a differential amplifier is provided to transpose one side of the control signal. Because of the operation of the differential amplifier, the amplitude of the control signal has a V-shaped characteristic at the different tensions in the tape with the vertex of the V occurring at the particular tension in the tape. The V-shaped characteristic causes the amplitude of the signal to be the same for corresponding deviations in the tension in the tape above and below the particular value. The transposed control signals are applied to the motor to control the speed of the motor, the polarity of the motor being dependent upon the operation of the reversing switch in the first and second states. The motor operates to drive the reel in a direction to aid the movement of the tape for tensions in the tape above the particular value and to oppose the movements of the tape for tensions in the tape below the particular value.

Figures 1, 2, 3:
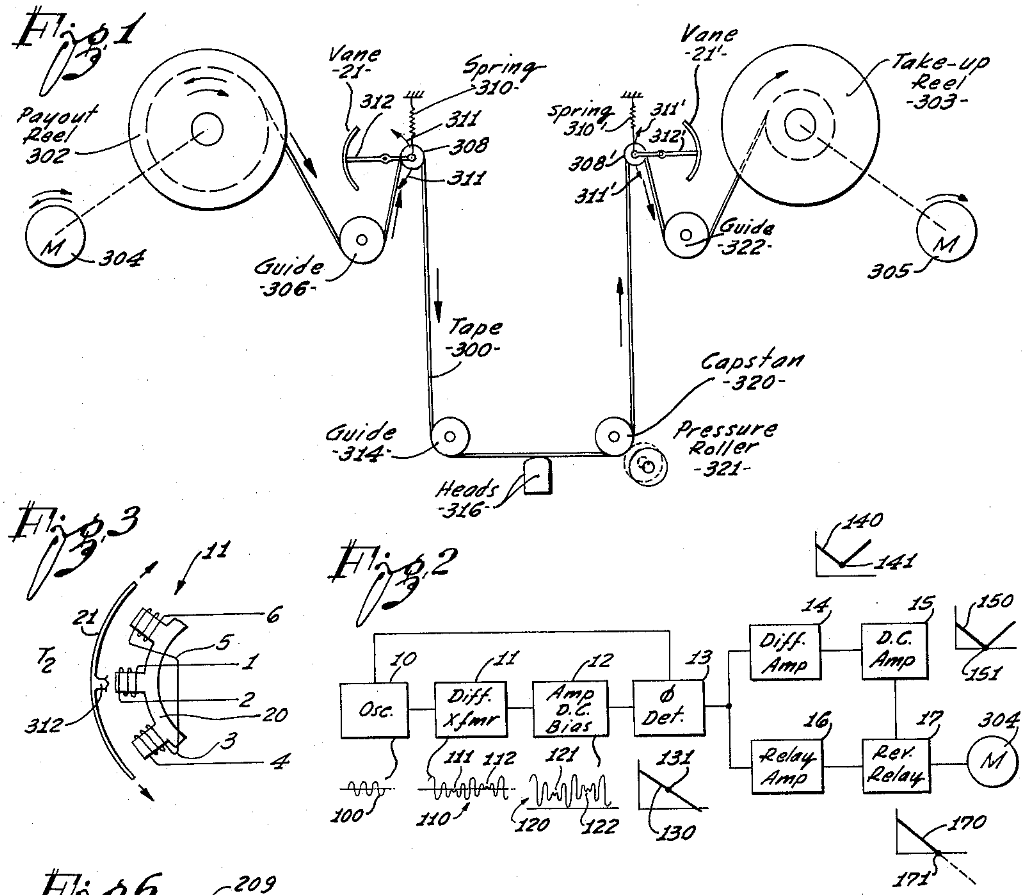
FIGURE 1 is a somewhat schematic view of a system for driving a medium such as a tape from a pay-out reel to a take-up reel.
FIGURE 2 is a schematic view, substantially in block form, of one embodiment of a system constituting this invention for controlling the tension at which the tape is maintained at each instant, at either the pay-out reel or the take-up reel, curves showing voltage waveforms produced by the different stages also being included in the figure.
FIGURE 3 is an enlarged schematic illustation of a differential transformer included in the embodiment shown in FIGURE 2.

FIGURE 1 illustrates a tape drive system for recording information on a tape medium and for subsequently reproducing the information from the tape medium. In the apparatus shown in FIGURE 1, a tape 300 is driven in the direction shown by the arows so as to become unwound from a pay-out reel 302 and become wound on a take-up reel 303. The pay-out reel 302 is driven by a motor 304 and the take-up reel 303 is driven by a motor 305. The pay-out reel 302 and the take-up reel 303 are driven by the motors 304 and 305, in either one of two opposite directions dependent upon the polarity of the voltage applied to the motors.

For example, if the tension in the tape 300 is above the particular value desired, the motor 304 rotates in a direction to aid the movement of the tape. This relieves tension on the tape 300 and allows the tension in the tape to decrease quickly to the desired value. The motor 304 is excited in an opposite direction when the tape tension is below the desired value. This imposes additional tension on the tape 300 so as to increase the tension in the tape to the desired value. The motor 304 still rotates in the direction of tape travel but it applies torque in the opposite direction. The motor 305 is controlled in a similar manner to maintain the tension in the tape at the take-up reel at a constant value.

As the tape 300 unwinds from the pay-out reel 302, it passes over a guide roller 306 which directs the tape to pass over a guide roller 308. The guide roller 308 is controllably tensioned by a spring 310 to bias the guide roller in a direction opposite to the direction in which the moving tape biases the guide roller 308. The guide roller 308 is in a central position when the tape tension has the desired value since the tension produced by the spring 310 is adjusted to equal the tension produced by the moving tape. The guide roller 308 swings in either of two directions, as indicated by arrows 311, when the tension produced by the moving tape is greater or less than the tension of the spring.

The tape 300 after passing over guide roller 308 makes a turn of 90° around guide roller 314. The tape now is in position to pass by the heads 316 and makes another turn of 90° between capstan 320 and pressure roller 321. The pressure roller 321 is engaged when the tape system is in operation. The tape passes over guide roller 308' which is controllably tensioned by a spring 310' in the same manner as guide roller 308 and spring 310. The tape is directed to guide roller 322 which passes the tape to take-up reel 303.

Connected to the guide rollers 308 and 308' are arms 312 and 312' which have vanes 21 and 21' positioned at the end of the arms. The vanes 21 and 21' are used in individual differential transformers, one of which is generally indicated at 11 in FIGURE 3, to follow the movement of the guide rollers 308 and 308' and to control the production of signals by the differential transformer in accordance with such movement.

The differential transformer 11 includes three windings on a common E-shaped core 20. A primary winding 1–2 is wound on the center leg of the core 20, with two secondary windings 3–4 and 5–6 on the two outer legs of the core 20. The secondary windings are wound with an opposite sense, with terminals 3 and 5 connected together, and with the output signal produced across terminals 4 and 6. The vane 21 is made of magnetic material and is used to couple the primary winding 1–2 to the secondary windings 3–4 and 5–6. The positon of the vane determines which of the two secondary windings is more closely coupled to the primary winding or if the secondary windings are equally coupled to the primary winding.

Since the position of the vane 21 is determined by the tension in the tape, the transformer 11 is adjusted to produce a zero output signal when the tape tension is at the desired value. This is accomplished by having the vane 21 in a central position at the desired tension in the tape 300 to couple the primary winding equally to each of the secondary windings. Since the secondary windings are wound in an opposite sense, the signals produced in the secondary windings are of equal amplitude with opposite phase to cancel each other.

When the tension in the tape changes from the desired value, the vane 21 rotates and the primary winding is coupled unequally to the secondary windings. One or the other of the secondary windings will predominate to produce an output signal. The amplitude of the output signal from the differential transformer is dependent upon the tension in the tape, and the phase of the output signal is dependent upon whether the tension in the tape is higher or lower than the desired value.

FIGURE 2 illustrates in block form a system for controlling the tension in a medium such as a tape according to the concepts of this invention. In the block diagram of FIGURE 2, an oscillator 10 produces an output signal 100 which is introduced to the differential transformer 11. As illustrated in FIGURE 3, the differential transformer 11 is controlled, for example, by the vane 21 which monitors the tension in the tape medium at the pay-out reel as described above to produce signal 110. When the tape tension passes from below the desired tension to above the desired tension, point 111 is produced which indicates a change in phase of the signal 110. The point 112 signifies the tape tension returning to its former position below the desired tension.

The signal 110 then passes to an A.C. amplifier 12 to obtain an amplification of the signal. Incorporated in the amplifier 12 is a D.C. bias to produce a signal 120 which has a single polarity regardless of the deviations in the tension in the tape from a particular value. Points 121 and 122 are similar to points 111 and 112 and indicate a change in phase of the signal 120.

Phase detector 13 receives the signal from the amplifier 12 and compares it with the signal from the oscillator 10 to determine if the signals are in phase or if they are 180° out of phase. The phase detector 13 is constructed to produce a direct voltage having a magnitude directly dependent upon the tension of the tape. The phase detector 13 is biased to produce a direct voltage having a single polarity regardless of deviations in the tension in the tape above or below a desired value. Point 131 corresponds to the value of the bias in the phase detector 13. Signals above the point 131 are representative of signals of the same phase from the oscillator 10 and the differential transformer 12, and, therefore, are representative of tape tensions to one side of the desired value. Signals below the point 131 are representative of signals of opposite phase from the oscillator 10 and the differential transformer 12 and, therefore, are representative of tape tensions to the other side of the desired value.

The signal 130 is applied to both the differential amplifier 14 and the relay amplifier 16. The differential amplifir 14 transposes the various values of the signal 130 below the point 131 to corresponding positions above the point 131 to produce a V-shaped response as shown by signal 140. The vertex point 141 of the signal 140 corresponds to the point 131 of the signal 130. In this way, the differential amplifier 14 effectively produces signals of equal amplitude for corresponding deviations in the tension in the tape medium on opposite sides of the desired value. The signal 140 then passes through the D.C. amplifier 14 which amplifies the signal and biases the signal to have the vertex located at a reference potential. This is shown as a signal 150 which is then applied to a reversing relay 17.

The reversing relay 17 is controlled by the magnitude of signal 130. The relay is designed to have a first state of operation for signals above the point 131 and a second state of operation for signals below the point 131. This results from the operation of a relay amplifier 16 which is biased to a state of conductivity for signals on one side of the point 131 and which becomes non-conductive for signals on the other side of the point 131. Since the point 131 occurs at the same tape tension as the point 151 of the signal 150, signals to the left of point 151 pass through the reversing relay 17 undistubed, while signals to the right of the point 151 have their polarity reversed by the reversing relay 17. This results in the application of a control signal 170 to the motor 304. The solid line is the resultant of the signals to the left of point 151, and the dotted line of reverse polarity is the resultant of the signals to the right of point 151 as reversed by the reversing relay 17. The application of the control signal 170 to the motor causes the motor to drive the pay-out reel in a direction and at a speed at each instant to maintain the tension in the tape constant at the desired value. The system of FIGURE 2 can be used in a similar manner to control the tape tension at the take-up reel.

Figures 4, 5:
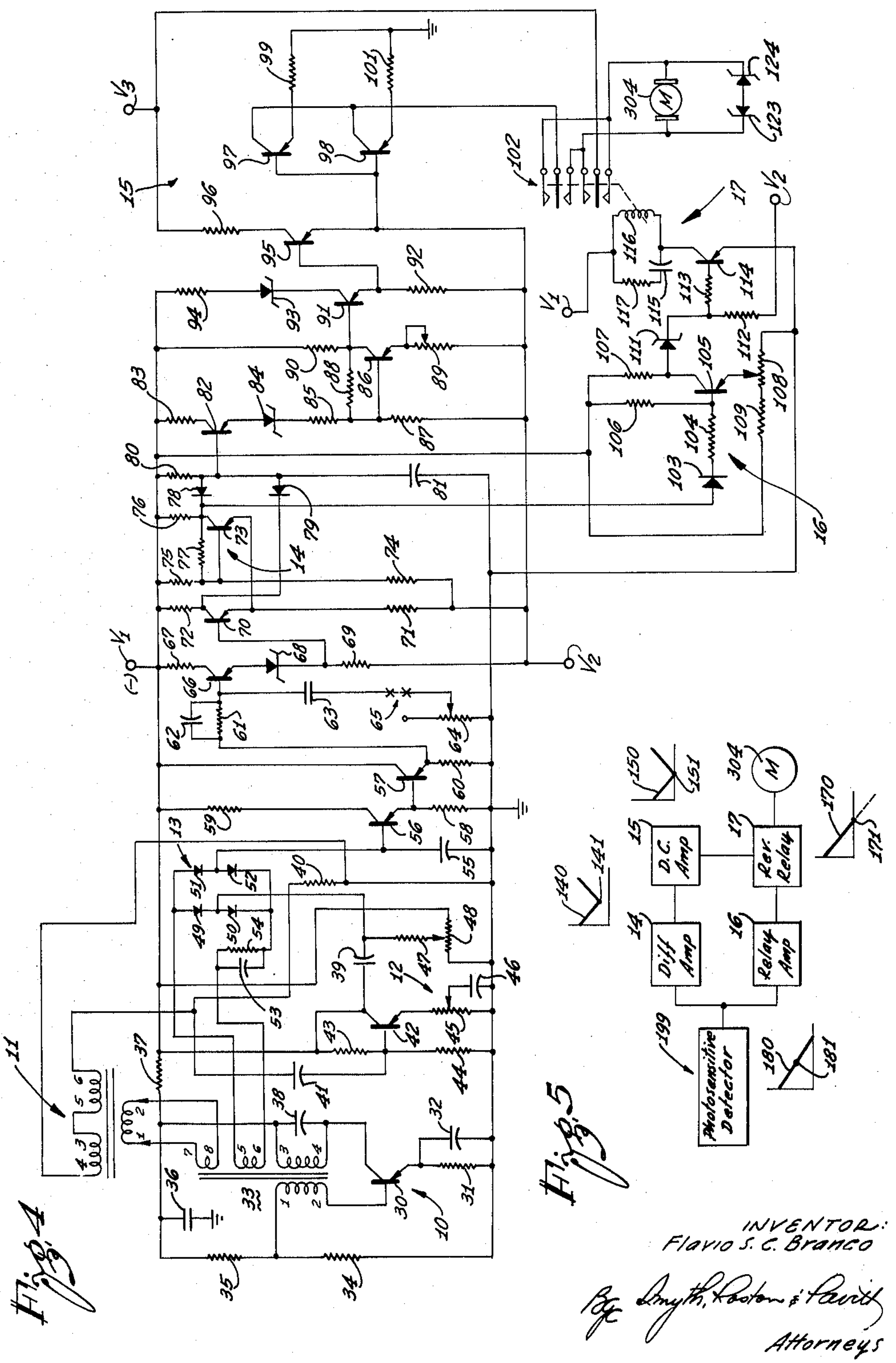
FIGURE 4 is a detailed circuit diagram of the embodiment shown in FIGURES 2 and 3.
FIGURE 5 is a schematic diagram, substantially in block form, of a second embodiment of the system constituting this invention.

FIGURE 4 illustrates in detail a system for performing the functions shown in FIGURE 2. The system includes the oscillator 10, which may operate at a suitable frequency such as 40 kilocycles per second. Included in the oscillator 10 is a current control member such as a transistor 30, which may be a PNP type 2N597. Connected between the emitter of transistor 30 and a reference potential such as ground are a resistance 31 and a capacitance 32. The resistance 31 may have a value of 220 ohms and the capacitance 32 may have a value of 1 microfarad. Winding 1–2 of a transformer 33 is connected between the base of transistor 30 and the junction of the resistances 34 and 35. The resistances 34 and 35 may have values of 10 and 100 kilohms respectively. The resistance 34 is connected at its other terminal to the reference potential such as ground, and the resistance 35 is connected to the junction of a capacitance 36, which may have a value of 50 mircofarads, and a resistance 37, which may have a value of 27 ohms. The other terminals of capacitance 36 and resistance 37 are respectively connected to ground and soruce $V_1$. Source $V_1$ may have a value of −18 volts.

Also connected to the junction of the capacitance 36 and the resistance 37 are winding 3–4 of transformer 33 and capacitance 38. The capacitance 38 may have a value of 0.047 microfarad. The other terminals of winding 3–4 and capacitance 38 are connected to the collector of the transistor 30. Output windings 5–6 and 7–8 of transformer 33 supply other portions of the system with signals from the oscillator.

The oscillator is of the tuned-collector type. The tuned circuit consists of winding 3–4 of transformer 33 and capacitance 38. The resistors 34 and 35 establish the base bias. The resistor 31 is the emitter bias stabilizing resistance. The capacitance 32 by-passes alternating current around resistor 31 and the capacitance 36 by-passes alternating current around resistors 34 and 35. Oscillations will start upon the application of a direct voltage through dropping resistor 37, and regeneration is accomplished by coupling the feedback signal from the winding 3–4 of transformer 33 to the winding 1–2 of transformer 33.

The output winding 7–8 of transformer 33 is connected to the primary winding 1–2 of a differential transformer 11. The terminal 3 of the winding 3–4 in the transformer 11 is connected to the reference potential such as ground, and the terminal 6 of the winding 5–6 in the transformer is connected to the junction of a resistance 40 and a capacitance 41. The resistance 40 may have a value of 100 ohms and the capacitance 41 may be 0.01 microfarad. As previously described, the output signal across the terminals 4 and 6 of the transformer 11 is either in phase or 180° out of phase with the input signal to the primary winding of the transformer, depending upon the direction of deviation of tape tension from the desired value. The output signal from the secondary windings 3–4 and 5–6 of the differential transformer 11 is applied across resistance 40 and through the coupling capacitor 41 to the base of a transistor 42.

The transistor 42 can also be a P-N-P type 2N597. A resistor 43 which may have a value of 100 kilohms is connected between the base of the transistor 42 and the source $V_1$. A resistor 44 which may have a value of 10 kilohms is connected between the base of the transistor 42 and the reference potential such as ground. The emitter of transistor 42 is connected to one end terminal of a potentiometer 45, the other end terminal of which is at the reference potential such as ground. The potentiometer 45 may have a value of 1 kilohm from one end terminal to the other end terminal. The movable arm of the potentiometer 45 is coupled electrically for alternating signals through capacitor 46 to ground. The capacitor 46 may have a value of 1 microfarad. The collector of the transistor 42 is connected to the source $V_1$ and also to one terminal of a capacitor 39 having a value of 0.1 microfarad. The other terminal of the capacitor 39 is connected to one end terminal of a resistor 47 which may have a value of 10 kilohms. The other terminal of resistor 47 has a common connection with the movable arm of a potentiometer 48. The end terminals of the potentiometer 48 are respectively connected to the source $V_1$ and the reference potential such as ground. The potentiometer 48 may have a value of 5 kilohoms from one end terminal to the other end terminal.

The transistor 42 and the associated circuitry form an amplifier for the alternating signals from the differential transformer 11 and also provide a D.C. bias for the incoming signals. Resistor 44 provides a base D.C. return path. The potentiometer 45 provides bias stability and gives optimum response and stability in the amplifier circuit. Capacitor 46 bypasses the A.C. signal around the lower portion of the potentiometer 45. The resistance 43 is the collector load resistor, and the alternating signals constituting the output from the amplifier are coupled through the blocking capacitor 39, which also blocks the passage of any direct voltage.

The resistor 47 and the potentiometer 48 provide a D.C. bias on the output signals from the amplifier so that the output signals are all of the same polarity. The jumper 65 is opened and the arm of potentiometer 48 is adjusted to produce a level corresponding to the level 131 in FIG. 2 when the differential transformer 11 provides a null output corresponding to the point 111 in FIG. 2. This gives the correct bias to the amplifier output signals to indicate that the tape tension is at the desired value.

The biased output signal from the junction of the capacitor 39 and the resistor 47 is introduced to the junction of diodes 49 and 50. The diodes 49 and 50 form a phase detector with diodes 51 and 52. They can all be type 1N99. The cathode of the diode 49 is connected to the anode of the diode 50. The cathode of diode 51 has a common connection with the anode of the diode 52. The anodes of the diodes 49 and 51 are connected to the terminal 5 of the winding 5–6 in the transformer 33. The cathodes of the diodes 50 and 52 are coupled electrically through the parallel combination of a capacitor 53 and a resistor 54 to the terminal 6 of the winding 5–6 of transformer 33. The capacitor 53 may have a value of 0.1 microfarad and the resistor 54 may have a value of 100 kilohms.

The phase detector compares the signal across the junction of the diodes 49 and 51 and the junction of the diodes 50 and 52 with the signal at the junction of the diodes 49 and 50 to determine if the signals are in phase or 180° out of phase. The signal introduced from the oscillator across the junction of the diodes 49 and 51 and the junction of the diodes 50 and 52 has a constant phase. However, the signal passing to the junction of the diodes 49 and 50 from the amplifier 12 can be either in phase with the oscillator signal or 180° out of phase with the oscillator signal depending upon the position of the vane 21 in the differential transformer 11. The output of the phase detector indicates if the tension in the tape medium is above or below the desired value. The output is taken from the junction of the diodes 51 and 52 and is applied to a capacitor 55, which is connected between the output junction and ground and may have a value of 0.01 microfarad.

The diodes 49, 50, 51 and 52 are forward biased during the introduction of positive signals on the anodes of the diodes 49 and 51 relative to the signals on the cathodes of diodes 50 and 52. The impedances of the diodes will then all be relatively low and the voltage drop across the diodes will be negligible. The voltage introduced to the cathode of the diode 49 and the anode of the diode 50 then appears at the junction of the cathode of the diode 51 and the anode of the diode 52. When the diodes 49, 50, 51 and 52 are forward biased, current flows through the capacitor 55 to charge the capacitor. The charge on the capacitor 55 is dependent upon the phase and amplitude of the signals from the amplifier 12 relative to the phase and amplitude of the signals from the oscillator 10.

When the signal introduced to the phase detector 13 from the oscillator 12 is in phase with the signal introduced to the phase detector from the amplifier 12, the signal at the junction of the diodes 49 and 50 has a peak amplitude at the same time that the diodes in the phase detector become forward biased by the signals from the oscillator 10. This causes signals of relatively high amplitude to be produced across the capacitor 55, and may be seen in FIGURE 2 by the signals to the left of the point 131 in curve 130.

When the signal introduced to the junction of the diodes 49 and 50 from the amplifier 12 is 180° out of phase with the signal introduced to the phase detector from the oscillator 10, the signal at the junction of the diodes 49 and 50 has a relatively low amplitude at the time that the diodes in the phase detector become forward biased. This causes signals to the right of the point 131 in FIGURE 2 to be produced.

The amplitude of the signals across the capacitor 55 varies only with the amplitude of the signals introduced to the junction of the diodes 49 and 50 from the amplifier 12 since the amplitude of the signals from the oscillator 10 is constant. The resultant signal from the phase detector has an amplitude representative of the deviation in tension in the tape medium from the desired value. The position of the signal above or below the point 131 provides an indication of the direction of that deviation.

The parallel circuit composed of resistor 54 and capacitor 53 is inserted to compensate for phase shifts in the differential transformer 11 and the amplifier 12. By providing this phase shift, the input signals to the phase detector 13 from the amplifier 12 are either in phase or 180° out of phase with the signals introduced to the phase detector from the oscillator 10. The resistor 54 may have a value of approximately 100 kilohms and the capacitor 53 may have a value of approximately 0.1 microfarad.

The output from the phase detector 13 constitutes a direct voltage which is impressed across the capacitor 55. This voltage is applied to transistors 56 and 57 in two emitter followers which are connected in a cascade relationship. The transistors 56 and 57 can both be PNP type 2N597. Connected from the emitter of transistor 56 to the reference potential such as ground is a resistor 58, which may have a value of 57 kilohms. Connected between the collector of transistor 56 and the source $V_1$ is a resistor 59, which may have a value of 100 ohms. Transistor 57 has a resistance 60 connected between the emitter and ground. The value of the resistance 60 may be 10 kilohms.

The emitter followers including the transistors 56 and 57 provide impedance matching between the phase detector 13 and successive stages. The output of the emitter follower including the transistor 57 is produced across the resistor 60 and applied to a lead-lag circuit in a series-parallel arrangement. The lead circuit is composed of a parallel arrangement of a resistor 61 and a capacitor 62, which may respectively have values of 88 kilohms and 2 microfarads. The lag circuit is composed of a series arrangement of capacitor 63 and a rheostat 64, which may respectively have values of 50 microfarads and 10 kilohms. The lead circuit of resistor 61 and capacitor 62 is used to compensate for the lag produced by the motor 304. The lag circuit of capacitor 63 and rheostat 64 is adjusted to compensate for phase shifts in other parts of the circuit.

The output from the lead-lag circuit is taken from the junction of resistor 61 and capacitor 63 and is applied to a transistor 66 in another emitter follower to provide additional impedance matching. The transistor 66 can be a PNP type 2N597. A resistance 67 which may have a value of 100 ohms is connected between the collector of the transistor 66 and the source $V_1$. Connected between the emitter of transistor 66 and a source $V_2$ is a series circuit constituting a Zener diode 68 and a resistance 69. The source $V_2$ can have a value of +6 volts; the Zener diode 68 can be a type 1N758, and the resistance 69 can have a value of 10 kilohms. The Zener diode is used in the emitter follower output to provide a constant voltage drop for matching voltage levels since the level of the output of the transistor 66 in an emitter follower is different than the level of the next stage.

The output is taken from the junction of the Zener diode 68 and resistance 69 and applied to the base of a transistor 70. The transistor 70 may be a PNP type 2N597. A resistance 71, which may have a value of 390 ohms, is connected between the emitter of the transistor 70 and the source $V_2$, and a resistance 72, which may have a value of 1.5 kilohms, is connected between the collector of the transistor and the source $V_1$.

The emitter of the transistor 70 is connected to the emitter of a transistor 73, which may also be a PNP type 2N597. Two resistors 74 and 75, which may respectively have values of approximately 330 ohms and 1 kilohm are in series between the sources $V_2$ and $V_1$ and have terminals common with the base of the transistor 73. A resistor 76 having a value of approximately 1.5 kilohms is connected between the collector of transistor 73 and the source $V_1$. A feedback resistor 77 having a value of approximately 10 kilohms extends electrically between the collector and the base of the transistor 73.

The output signals on the collectors of the transistors 70 and 73 respectively pass through a pair of diodes 78 and 79 to the input of the next stage. The collector of the transistor 73 is connected to the cathode of the diode 78, which may be a type 1N99. In like manner, the collector of the transistor 70 is connected to the cathode of diode 79, which may also be a type 1N99. The anode of the diode 78 is common with the anode of the diode 79. A resistor 80, which may have a value of approximately 22 kilohms, is disposed electrically between the junction of the diode plates and the source $V_1$. A capacitor 81, which may have a value of approximately 0.22 microfarad, extends electrically from the plates of the diodes 78 and 79 to the reference potential such as ground. The output signal from the plates of the diodes 78 and 79 is applied to the base of a transistor 82 in an emitter follower.

The transistors 70 and 73 and the diodes 78 and 79 are included in the differential amplifier 14 shown in FIGURE 2. The resistors 71, 72, 74, 75 and 76 provide the proper biases and loads and the resistor 77 provides a negative feedback for stabilizing the circuit. The transistors 70 and 73 operate as a push-pull amplifier so that the output responses of the two transistors will be complementary. For example, when the signal on the base of the transistor 70 tends to become negative, an increased current flows through the transistor. This current produces an increased voltage across the resistor 72 so that the voltage on the collector of the transistor 70 tends to become positive. The increased current also produces an increased voltage drop across the resistor 71 so that the voltage on the emitters of the transistors 70 and 73 tends to become negative. The voltage on the collector of the transistor 70 tends to become positive at the same time that the voltage on the emitter of the transistor 70 tends to become negative because the transistor 70 has a decreased impedance as a result of the increased flow of current through the transistor 70.

When the voltage on the emitter of the transistor 73 tends to become negative, the current through the transistor decreases. This causes the voltage across the resistor 76 to decrease so that the voltage on the collector of the transistor 73 tends to become negative. In this way, the voltage on the collector of the transistor 70 tends to become positive at the same time that the voltage on the collector of the transistor 73 tends to become negative. In like manner, a decreased flow of current through the transistor 70 tends to produce a negative voltage on the collector of the transistor 70 and a positive voltage on the collector of the transistor 73. It will accordingly be seen that the transistors 70 and 73 provide a differential effect with respect to the voltages on the collectors of the transistors. It is also seen that the transistors 70 and 73 serve as valve means since they control the flow of current in various stages of the differential amplifier 14.

The signal at the junction of the plates of diodes 78 and 79 follows the voltage on the collector of one of the transistors 70 or 73, whichever has a relatively negative potential in comparison to the potential on the other collector. This results in an output signal as shown in FIGURE 2 at 140. For example, when the potential on the collector of the transistor 70 is negative relative to the potential on the collector of the transistor 73, the diode 79 becomes conductive before the diode 78 so as to control the potential on the anodes of the diodes. Since the transistors 70 and 73 have a differential operation, one of the transistors controls the potential on the plates of the diodes 78 and 79 on one side of the control point 131 and the other transistor controls the potential on the plates of the diodes on the other side of the control point 131. In this way, signals below the point 141 are eliminated since one or the other of the diodes is cut off depending upon which collector has a relatively larger negative potential. The curve 140 accordingly has signals of equal amplitude representative of corresponding deviations in the tension in the tape medium on both sides of the desired value.

The output signal on the plates of the diodes 78 and 79 is applied to the base of a transistor 82 in an emitter follower. The transistor 82 may be a PNP type 2N597. Connected between the collector of the transistor 82 and the source $V_1$ is a resistor 83 which may have a value of 100 ohms. A connection is made from the emitter of the transistor 83 to the plate of a Zener diode 84, preferably of a type 1N750. The cathode of the Zener diode 84 has a common connection with one terminal of a resistor 85, which may have a value of approximately 860 ohms. The other terminal of the resistor 85 is connected to the base of a transistor 86. The transistor 86 may be a type 2N597.

Also connected to the base of the transistor 86 is one terminal of a resistor 87, which may have a value of 1 kilohm. The other terminal of the resistor 87 is connected to the source $V_2$. A feedback resistor 88 preferably having a value of approximately 10 kilohms extends electrically from the base to the collector of the transistor 86. A variable resistor 89 preferably having a value of approximately 390 ohms is disposed electrically between the emitter of the transistor 86 and the source $V_2$. A resistor 90 is connected between the collector of transistor 86 and the source $V_1$ and is preferably provided with a value in the order of 100 ohms.

The output on the collector of the transistor 86 is applied to the base of a transistor 91 in an emitter follower. The transistor 91 can be a type 2N597. A resistor 92, which can have a value of 4.7 kilohms, is disposed electrically between the emitter of transistor 91 and the source $V_2$. A Zener diode 93 of type 1N750 and a resistor 94 having a value of 100 ohms are in series between the collector of the transistor 91 and the source $V_1$.

The output on the emitter of transistor 91 is applied to the base of a transistor 95 which may be a type 2N386. A resistor 96, which may have a value of 10 ohms, is disposed between the collector of transistor 95 and a source $V_3$ having a value preferably in the order of −28 volts. The emitter of transistor 95 is connected to the source $V_2$ and also to the bases of transistors 97 and 98 disposed electrically in parallel. Transistors 97 and 98 may both be of type 2N274. The emitters of transistors 97 and 98 are connected respectively through resistors 99 and 101 to the reference potential such as ground. Each resistor may have a value of 0.5 ohm. The collectors of transistors 97 and 98 have a common connection to produce a resultant output control signal which is applied through reversing switch 102 to one side of the motor 304. The other side of the motor is connected through the reversing switch 102 to the source $V_3$.

The operation of the transistor 82 in an emitter follower is similar to the transistor 66 in an emitter follower since there is a Zener diode in the emitter lead to match a difference in voltage levels in the emitter follower and the next stage. Resistors 80 and 83 provide the proper base and collector bias for the transistor 82. The capacitor 81 by-passes alternating current to the reference potential from the input signal applied to the base of the transistor 82. The output is taken from the junction of resistors 85 and 87 and applied to the base of a transistor 86.

Transistor 86 has a gain of about 2, and inverts the phase of the incoming signal. A potentiometer 89 is used to vary the bias on the emitter of transistor 86. The bias is adjusted, as illustrated in FIG. 2, so that the output stages of the amplifier cuts off at all magnitude signals below the vertex 141 of the control signal 140. This produces an output signal 150 from the direct current amplifier which has its vertex point 151 at the reference potential.

Feedback resistor 88 provides stability for transistor 86, and the output signal from the transistor 86 is taken across load resistor 90. The output signal is then applied to two emitter followers in series. The first emitter follower has a transistor 91 and is used to match the impedance of the transistor 86 to the following stages. The collector bias supply of the transistor 91 has a resistor 94 and a Zener diode 93 to provide voltage stabilization. The output from the first emitter follower is taken across an emitter load resistance 92 and is then applied to the base of a transistor 95.

The second emitter follower, which uses the transistor 95, provides both impedance matching and a current gain. The output of the transistor 95 is coupled electrically to the common connection of the base of output transistor 97 and output transistor 98. The output transistors conduct a high current since they carry the control currents which are applied to the motor 304. The output of the transistors 97 and 98 are applied to the motor 304 through the reversing switch 102, which forms a part of the reversing relay 17 of FIGURE 2. The motor 304 has two Zener diodes 123 and 124 connected across the motor to limit voltage surges and protect the power transisitors.

The operation of the switch 102 is controlled by circuitry including a diode 103. The plate of the diode 103 is connected to the collector of the transistor 73. The cathode of the diode 103 is coupled electrically through a resistor 104 to the base of a transistor 105. The diode 103 may be a type 1N99; the resistor 104 may have a value of approximately 3.3 kilohms; and the transistor may be a type 2N597. A resistor 106, which have a value of approximately 3.3 kilohms, is connected between the collector of the transistor 105 and the source $V_1$. The emitter of transistor 105 is electrically coupled to a movable arm of a potentiometer 108 having a value of approximately 100 ohms. The two fixed arms of the potentiometer 108 are respectively connected to the reference potential such as ground and to one terminal of a resistor 109. The other terminal of the resistor 109 is connected to the source $V_1$. The resistor 109 preferably has a value of approximately 100 ohms.

The collector of the transistor 105 is connected to the anode of a Zener diode 111, which may be a type 1N758. The cathode of the diode 111 is electrically coupled to first terminals of resistors 112 and 113. Resistors 112 and 113 may have values of 4.7 kilohms and 1 kilohm, respectively. The second terminal of the resistor 112 is connected to the source $V_2$, and the other terminal of the resistor 113 is connected to the base of the transistor 114. The transistor 114 is preferably of a type 2N675. The emitter of the transistor 114 extends electrically to ground and the collector has a common connection with a capacitor 115 and one terminal of a relay winding 116. The capacitor 115 is electrically coupled through a resistor 117 to the source $V_1$ to act as a dampening circuit for the winding. The capacitor 115 and the resistor 117 have values preferably of 1 microfarad and 100 ohms, respectively. The other terminal of the relay winding 116 is connected to the source $V_1$. The relay winding is magnetically coupled to the armatures of the switch 102 to control the operation of the switch. The armatures of the switch 102 are spring biased to their upper positions in FIGURE 4 and are actuated to their lower position in FIGURE 4 upon the energizing of the relay winding 116.

The signal at the collector of the transistor 73 has the same general characteristic as the curve 130 in FIGURE 2. The transistor 105 has sharp operating characteristics due to a very high gain. When no current flows through the diode 103, the bias provided by the resistor 106 causes the transistor 105 to saturate since the base of the transistor 105 is relatively negative. When the transistor 106 saturates, a high current is drawn through the resistor 107 so that the voltage on the base of the transistor 114 is relatively positive. The transistor 114 is now cut off and the relay winding 116 draws no current. The switch 102 is mechanically biased to keep it in a first state of operation when the transistor 114 is cut off. Control signals of one polarity are now introduced to the motor 304.

The bias potentiometer 108 of the transistor 105 is set so that the voltage applied through the diode 103 from the diode 78 becomes positive to an amplitude corresponding to that of the point 131 of the curve 130. At this amplitude, a sufficient amount of current flows through the diode 103 and the resistor 104 such that the positive voltage produced at the base of the transistor 105 counteracts the negative bias provided by the resistor 106, thereby cutting off the transistor. This causes the current through the resistor 107 to become interrupted and the voltage on the base of the transistor 114 to become relatively negative. This turns on transistor 114 to draw current through the relay winding 116 so that the armatures of the switch 102 become actuated to their lower position in FIGURE 4 and to a second state of operation to reverse the control signals applied to the motor 304 and to obtain an operation of the motor in an opposite direction. This switching action occurs when the control signal applied to the motor passes through the point 151 of the curve 150 in FIGURE 2. Since the polarity of the signals applied to the motor 304 become reversed in polarity at the point 151 of the curve 150, the signals applied to the motor 304 appear as curve 170 in FIGURE 2.

The system of FIGURE 4, described above, solves the problems of the prior art in that the system provides an accurate and simple method of controlling the tension in a medium such as a tape. Signals of only one polarity are used but the control motor operates in both direction. The invention eliminates the additional circuitry and supply voltage required by the prior art and substitutes a simple system of greater accuracy.

FIGURES 5, 6, 7 and 8 illustrate another embodiment of the invention. This embodiment uses a photosensitive detecting circuit, indicated generally at 199 in FIGURES 5 and 6, to replace the oscillator 10, the differential transformer 11, the amplifier 12, and the phase detector 13, shown in FIGURE 2 and described in detail above.

Figure 6:
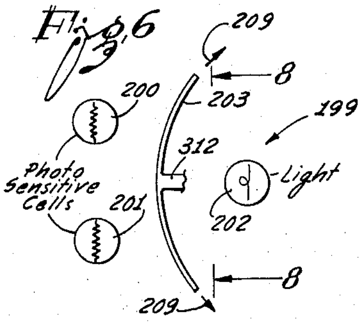
FIGURE 6 is a schematic diagram of photoelectric apparatus included in the embodiment shown in FIGURE 5.

FIGURE 6 shows the physical configuration of the photosensitive detector. Photosensitive cells 200 and 201 have a variable resistance across their terminals. The value of the resistance in each of the cells 200 and 201 is dependent upon the amount of light passing to the individual cells 200 and 201. A light source 202 having a substantially constant intensity shines through slots 206 and 207 in a vane 203 (FIGURE 8) to the cells 200 and 201. The position of the vane 203 determines the amount of light passing from the source 202 to each of the cells 200 and 201. The position of the vane 203 is controlled in a manner similar to the control of the vane 21 in FIGURE 1 so as to be pivotable in a direction dependent upon the derivation in the tension in the tape 300 from a particular value and so as to be pivotable through an angle dependent upon the magnitude of the deviation in the tension in the tape 300 from the particular value.

Since it is the area of the slots 206 and 207 which controls the amount of light that the cells 200 and 201 receive, the boundaries of the slots are provided with a suitable configuration such as a concave configuration such that the area of the slots 206 and 207 varies linearly with changes in the rotary disposition of the vane 203. This causes the area of one of the slots 206 and 207 to increase linearly and the area of the other slot to decrease linearly as the pivotable disposition of the vane 203 varies. This produces correspondingly linear changes in resistance of the cells 200 and 201.

Figure 7:
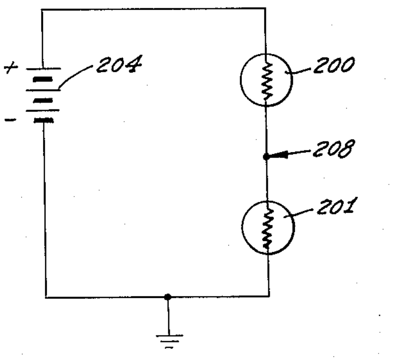
FIGURE 7 is a somewhat schematic view of an electrical circuit for energizing the photoelectric apparatus shown in FIGURE 6.
Figure 8:
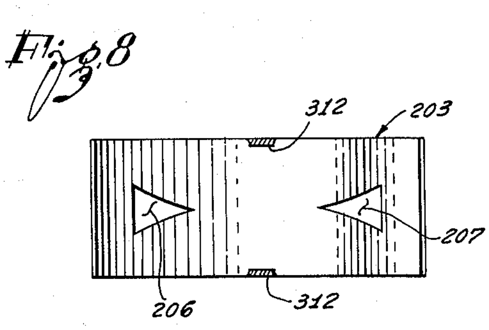
FIGURE 8 is a schematic view of a vane included in the photoelectric apparatus shown in FIGURE 6.

The photosensitive cells are connected in a circuit shown in FIGURE 7. The cells 200 and 201 are in series across a direct current source 204, such as a battery, having one of its terminal connected to a reference potential such as ground. The output of the circuit is obtained between a terminal 208, which is the junction of photosensitive cells 200 and 201 and the reference potential such as ground.

The tension in the tape 300, as illustrated in FIGURE 1, controls the position of the guide roller 308 to ultimately control the position of the vane 203. As the vane rotates either clockwise or counterclockwise, one of the photosensitive cells increases in resistance while the other cell decreases in resistance. The output from the circuit has a characteristic as shown in FIGURE 5 as curve 180. As will be seen, the curve 180 has characteristics similar to those of the curve 130 in FIGURE 2.

If the photosensitive cells 200 and 201 have the same characteristics, point 181 on curve 180 equals one-half the value of the direct current source 204, since the vane 203 is centrally located to couple the light from the light source 202 in an equal manner to the cells 220 and 201.

In this way, the point 181 represents the desired tension in the tape 300 and corresponds to the point 131 in the curve 130 of FIGURE 2. The portion of the curve 180 to the left of the point 181 represents deviations in the tension in the tape 300 in a first direction from the desired value, and the portion of the curve 180 to the right of the point 181 represents deviations in the tension in the tape in an opposite direction from the desired value.

FIGURE 5 shows in block form the complete system using the photosensitive detector 199.

The output of the photosensitive detector 199 is applied to the differential amplifier 14 and the relay amplifier 16, both of which are also shown in FIGURE 2. The differential amplifier transposes portions of the curve 180 below the point 181 to a corresponding position above the point 181. This causes the curve 140 to be produced and to be provided with a V— characteristic having its vertex point 141 corresponding to the point 181 of the curve 180.

The output from the differential amplifier is applied to the direct current amplifier 15 which amplifies the signal and passes only signals having a magnitude above the point 141 of the curve 140. This causes the curve 150 to be produced where the vertex point has been shifted to a reference potential such as ground. The output from the direct current amplifier 15 is applied through the reversing relay 17 to control the speed of the motor 304. The reversing relay 17 is controlled by the relay amplifier 16 to be in either one of two states of operation. When the values of the signal 180 are above point 181, the relay amplifier 16 controls the reversing relay in its first state of operation to apply signals of a first polarity to the motor 304. When the input signals to the relay amplifier are below point 181, the relay amplifier 16 controls the reversing relay in its second state of operation to apply signals of an opposite polarity to the motor 304.

As will be seen, the embodiment of FIGURES 5, 6, 7 and 8 eliminates many of the components necessary in the embodiment of FIGURES 1, 2, 3 and 4. However, since the system uses light to control the photosensitive detector, care must be taken to prevent outside light from disrupting the operation of the system by adding spurious influences. This may require that the light source 202, the photocell 200 and 201 and the vane 203 be disposed within a dark enclosure.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with a movable medium, a control system for maintaining the tension in the movable medium at a desired value, including, control means operatively coupled to the medium for exerting a driving force on the medium in first and second opposite directions in accordance with the direction and the degree of excitation of the control means, means responsive to the movement of the medium for producing control signals having an amplitude on one side of a particular value for tensions in the movable medium in excess of the desired value and having an amplitude on the other side of the particular value for tensions lower than the desired value, switching means having first and second states of operation and responsive to the control signals to become operative in the first state for control signals with an amplitude on one side of the said particular value and to become operative in the second state of operation for control signals with an amplitude on the other side of the said particular value, means responsive to the control signals for transposing control signals on one side of the particular value to a corresponding position on the other side of the particular value to obtain signals of equal amplitude for corresponding deviations in tensions on both sides of the desired value, and means responsive to changes in the states of operation of the switching means between the first and second states to change the direction of excitation of the control means and responsive to the transposed control signal to change the degree of excitation of the control means in accordance with the amplitude of the transposed control signal.

2. In combination for use with a movable recording medium, a motor control system for maintaining the tension in the medium at a desired value, including, control means operatively coupled to the movable recording medium for exerting a force on the medium in first and second opposite directions and with a variable intensity to control the tension in the medium, means responsive to the movement of the medium for producing a control signal having a phase corresponding to the direction of the deviation of the tension in the movable recording medium from the desired value and having an amplitude corresponding to the magnitude of deviation of the tension in the movable recording medium from the desired value, means operatively coupled to the control signal means for biasing the control signal to the same polarity on opposite sides of a null point corresponding to the value of the biasing means and regardless of the direction of any deviation of the tension in the movable recording medium from the desired value, reversing means having first and second states of operation and responsive to the control signal to become operative in the first state of values of the control signal on one side of the null point and to become operative in the second state for values of the control signal on the other side of the null point, means transposing the biased control signal on one side of the null point to a corresponding value on the other side of the null point to have all values of the control signal on the same side of the null point, means responsive to the amplitude of the transposed control signal to regulate the intensity of the force exerted by said control means on said movable recording medium, and means responsive to the operation of said reversing means in the first and second states to regulate the direction of the force exerted by said control means on said movable recording medium.

3. In combination for use with a movable medium, a control system for maintaining the tension in the movable medium at a desired value, including control means operatively coupled to the medium for exerting a driving force on the medium in first and second opposite directions in accordance with the direction and the degree of excitation of the control means, means responsive to the movements of the medium for producing control signals having an amplitude on one side of a particular value for tensions in the movable medium in excess of the desired value and having an amplitude on the other side of the particular value for tensions lower than the desired value, switching means having first and second states of operation and responsive to the control signals to become operative in the first state for control signals with an amplitude on one side of the particular value and to become operative in the second state for control signals with an amplitude on the other side of the particular value, transposing means including first and second valve means interconnected to produce complementary impedance characteristics for the first and second valve means in accordance with the introduction of signals to the first valve means and responsive to variations in the characteristics of the control signals to obtain first variations in impedance in the first valve means and opposite variations in impedance in the second valve means, the transposing means further including means interconnected to the first and second valve means and responsive to the impedance characteristics of the first and second valve means to produce the same amplitude output signals for corresponding deviations in the tension in the medium on both sides of the desired value, and means responsive to changes in the states of operation of the switching means between the first and second states to change the direction of excitation of the control means and responsive to the output signals from the transposing means to change the degree of excitation of the control means in accordance with the amplitude of the output signal.

4. In combination with a movable tape medium, a control system for maintaining the tension in the medium at a desired value, including, means for producing signals having a single polarity and having a sloping characteristic passing through a particular value representative of the desired tension in the tape medium and having values of the signal located on the sloping characteristic above and below the particular value in representation of deviations in the tension in the tape medium in both directions from the desired value, reversing means having first and second states of operation and responsive to the signal having the sloping characteristic to obtain an operation of the reversing means in the first state of operation for signals above the particular value and in the second state of operation for signals below the particular value, means responsive to the signal having the sloping characteristic for transposing the sloping characteristic to a substantially V characteristics with the vertex of the V representative of the desired tension in the tape medium, means responsive to the signal having the V characteristic for biasing the signal to a position with the vertex of the V characteristic at a reference potential, and motor means operatively coupled to the reversing means and responsive to the biased signal and operatively coupled to the movable medium for regulating the speed of the motor means in accordance with the amplitude of the biased signal and for regulating the direction of rotation of the motor means in accordance with the state of operation of the reversing means.

5. In combination for use with a movable recording medium, a direct current system for maintaining the tension in the movable recording medium at a desired value, including, direct current motor means operatively coupled to the medium to exert a force on the medium in first and second opposite directions for controlling the tension in the medium in accordance with the amplitude and polarity of a direct current signal applied to the motor, means operatively coupled to the medium for producing direct current control signals having an amplitude in accordance with the deviation in tension in the movable recording medium from the desired value and having a polarity in accordance with the direction of deviation of the tension in the movable recording medium from the desired value, direct current means operatively coupled to the control signal means for biasing the control signal to the same polarity on opposite sides of a particular value and to the same value for corresponding deviations in the tension in the movable recording medium in both directions from the desired value, switching means having first and second states of operation and responsive to the biased control signal to become operative in the first state of operation for control signals to one side of the particular value and to become operative in the second state of operation for control signals to the other side of the particular value, means responsive to the amplitude of the biased control signals on one side of the particular value to control the force exerted by the direct current motor means in one direction and responsive to the amplitude of the biased control signals on the other side of the particular value to control the force exerted by the direct current motor means in the other direction with a resultant regulation of the tension in the movable recording medium, and means responsive to the first and second states of operation of the switching means to control the polarity of the biased control signals applied to the motor means to change the direction of the force applied by the motor means on the movable recording medium.

6. In combination for use with a movable medium, a control system for maintaining the tension in the movable medium at a desired value, including, control means operatively coupled to the medium for exerting a driving force on the medium in first and second opposite directions in accordance with the direction and the degree of excitation of the control means, means responsive to the movement of the medium for producing control signals having an amplitude on one side of a particular value for tensions in the movable medium in excess of the desired value and having an amplitude on the other side of the particular value for tensions lower than the desired value, relay control means responsive to the control signals and including a first and second valve means interconnected in a cascade arrangement and having the first valve means in a state of saturation with the introduction of control signals to one side of the particular value to bias the second valve means to a state of non-conduction and having the first valve means in a state of non-conduction with the introduction of control signals to the other side of the particular value to bias the second valve means to a state of conduction, relay means having a first and second state of operation and responsive to the second valve means of the relay control means to obtain the operation of the relay means in the first state of operation when the second valve means are in a state of non-conduction and to obtain the operation of the relay means in a second state of operation when the second valve means are in a state of conduction, and means responsive to the amplitude of the control signals on one side of the particular value and to the relay means in a first state of operation to control the force exerted by the control means on the medium in one direction and responsive to the amplitude on the other side of the particular value and to the relay means in the second state of operation to control the force exerted by the control means on the medium in the other direction.

7. In combination for use with a movable medium, a control system for maintaining the tension in the movable medium at a desired value, including, control means operatively coupled to the movable medium for applying a force to the medium in first and second directions and with a variable intensity to maintain the tension in the movable medium at the desired value, a source of energy, first and second pickup means responsive to the energy from the source and differentially interconnected to produce first and second output signals with complementary characteristics in accordance with the amount of energy from the source and to produce a resultant output signal in accordance with the relative characteristics of the first and second output signals, a control member operatively coupled to the medium and disposed between the source and the first and second pickup means for displacements from a median position in accordance with the direction and magnitude of the deviation in the tension in the medium from the desired value, regulating means responsive to the tension in the movable medium and including the control member to control the coupling of the energy from the source to the first and second pickup means for the production of the complementary signals by the first and second pickup means and for the production of an output signal having a particular value at the desired tension of the medium, and having amplitudes on opposite sides of the particular value for respective deviations in the tension in the medium above and below the desired value, switching means responsive to the resultant output signal from the first and second pickup means to become operative in a first state for values of the resultant output signal on one side of the particular value and to become operative in a second state for values of the resultant output signal on the other side of the particular value, and means responsive to the amplitude of the resultant output signal from the first and second pickup means to control the intensity of the force applied by the control means to the movable medium and responsive to the operation of the switching means in the first and second states to control the direction of the force applied to the movable medium by the control means.

8. In combination for use with a movable medium, a control system for maintaining the tension in the movable medium at a desired value, including, control means operatively coupled to the movable medium for exerting a force on the medium in first and second opposite directions and with a variable intensity to control the tension in the medium, oscillator means for producing a reference signal at a particular frequency, differential transformer means, including, an input winding electrically connected to the oscillator means to produce a signal at the particular frequency, two output windings interconnected in an opposite sense and electrically coupled to the input winding to produce an output signal from the two output windings, regulating means disposed in magnetically coupled relationship to the input winding and the two output windings and responsive to the changes in the movement of the medium from the desired value for regulating the coupling of the input winding to the output winding in accordance with the direction and magniture of deviation in the tension in the medium from the desired value to obtain the production by the output winding of a first phase for the output signal for tensions in the medium on one side of the desired value and of a second opposite phase for the output signal for tensions on the other side of the desired value, phase detector means responsive to the output signal from the differential transformer and to the reference signal from the oscillator means for producing a control signal having values on one side of a particular value for tensions in excess of the desired value and having values on the other side of the particular value for tensions lower than the desired value, relay control means having a state of conduction and a state of non-conduction and response to the control signal to become operative in the state of conduction for control signals with an amplitude on one side of the particular value and to become operative in the state of non-conduction for control signals with an amplitude on the other side of the particular value, relay means having a first and second state of operation and responsive to the relay control means to become operative in the first state of operation with the relay control means in a state of conduction and to become operative in the second state of operation with the relay control means in a state of non-conduction, means responsive to the control signals for transposing control signals on one side of the particular value to a corresponding position on the other side of the particular value to obtain a V-characteristic signal having signals of equal amplitude for corresponding deviations in the tension in the medium on both sides of the desired value, means responsive to the signal having a V characteristic for biasing the signal to a position with the vertex of the V characteristic at a reference potential, and means responsive to changes in the states of operation of the relay means between the first and second states to change the direction of excitation of the control means and responsive to the biased V-characteristic signal to change the degree of excitation of the control means in accordance with the amplitude of the biased V-characteristic signal.

9. In combination for use with a movable medium, a control system for maintaining the tension in the movable medium at a desired value, including, control means operatively coupled to the medium for exerting a driving force on the medium in first and second opposite directions in accordance with the direction and the degree of excitation of the control means, photosensitive means responsive to the tension in the movable medium, including, a light source for producing a beam of light, first and second photosecsitive cell means connected in series and responsive to the light from the source to produce a control signal at the junction of the photosensitive cell means, regulating vane means interposed between the light source and the first and second photosensitive cell means to control the amount of light passing from the light source to each of the first and second photosensitive cell means and responsive to changes in the tension in the medium to pass an increased amount of light from the light source to one photosensitive cell means and a correspondingly decreased amount of light from the light source to the other photosensitive cell means for the production at the junction of the photocell means of a control signal having values on one side of a particular value for tensions in excess of the desired tension in the medium and having values on the other side of the particular value for tensions in the medium lower than the desired tension, relay control means having a state of conduction and a state of non-conduction and responsive to the control signal to become operative in the state of conduction for control signals to one side of the particular value and to become operative in the state of non-conduction for control signals to the other side of the particular value, relay means having a first and second state of operation and operatively coupled to the relay control means to become operative in the first state with the relay control means in a state of conduction and to become operative in the second state of operation with the relay control means in a state of non-conduction, means responsive to the control signals for transposing control signals on one side of the particular value to a corresponding position on the other side of the particular value to obtain signals of equal amplitude for corresponding deviations in the tension in the medium on both sides of the desired value, and means responsive to changes in the states of operation of the relay means between the first and second states to change the direction of excitation of the control means and responsive to the transposed control signals to change the degree of excitation of the control means in accordance with the amplitude of the transposed control signal.

10. In combination for use with a movable medium, a control system for maintaining the tension in the movable medium at a desired value, including, control means operatively coupled to the medium for exerting a driving force on the medium in first and second opposite directions in accordance with the direction and the degree of excitation of the control means, oscillator means for producing a constant amplitude signal having a particular phase relationship, differential transformer means responsive to the oscillator means and to the tension in the movable medium for producing an output signal having an amplitude in accordance with the tension in the movable medium and having an in-phase relationship with the signal of the oscillator means when the tension in the movable medium is to one side of the desired tension and an out-of-phase relationship with the signal of the oscillator means when the tension in the movable medium is to the other side of the desired tension, phase detector means responsive to the output signal from the differential transformer and to the signal from the oscillator means for producing a control signal having values on one side of a particular value for an in-phase relationship between the signals from the oscillator means and the differential transformer means and having values of the control signal on the other side of the particular value for an out-of-phase relationship between the signals from the oscillator means and the differential transformer means, relay control means having a state of conduction and a state of non-conduction and responsive to the control signal of the phase detector means to become operative in the state of conduction for control signals to one side of the particular value and to become operative in the state of non-conduction for control signals to the other side of the particular value, relay means having a first and second state of operation and responsive to the relay control means to become operative in the first state of operation with the relay control means in a state of conduction and to become operative in the second state of operation with the relay control means in a state of non-conduction, means responsive to the control signals from the phase detector means for transposing the control signals on one side of the particular value to a corresponding position on the other side of the particular value to obtain a V-characteristic output signal having signals of equal amplitude for corresponding deviations in tension on both sides of the desired value, means responsive to the signal having a V characteristic for biasing the signal to a position with the vertex of the V characteristic at a reference potential, and means responsive to changes in the states of operation of the relay means between the first and second states to change the direction of excitation of the control means and responsive to the biased V-characteristic signal to change the degree of excitation of the control means in accordance with the amplitude of the transposed output signal.

11. In combination for use with a movable medium, a control system for maintaining the tension in the movable medium at a desired value, including, control means operatively coupled to the medium for exerting a driving force on the medium in first and second opposite directions in accordance with the direction and the degree of excitation of the control means, photosensitive means responsive to the tension in the movable medium for producing a direct current output signal having a single polarity and having an amplitude to one side of a particular value for tensions in the movable medium in excess of the desired value and having an amplitude to the other side of a particular value for tension in the movable medium lower than the desired value, relay control means having a state of conduction and a state of non-conduction and responsive to the output signal of the photosensitive means to become operative in the state of conduction for output signals with an amplitude to one side of the particular value and to become operative in the state of non-conduction for output signals with an amplitude to the other side of the particular value, relay means having a first and second state of operation and responsive to the relay control means to become operative in the first state of operation with the relay control means in a state of conduction and to become operative in the second state of operation with the relay control means in a state of non-conduction, means responsive to the output signals from the photosensitive means for transposing the output signals on one side of the particular value to a corresponding position on the other side of the particular value to obtain a V-characteristic output signal having signals of equal amplitude for corresponding deviations in tension on both sides of the desired value, means responsive to the signal having a V characteristic for biasing the signal to a position with the vertex of the V characteristic at a reference potential, and means responsive to changes in the states of operation of the relay means between the first and second states to change the direction of excitation of the control means and responsive to the biased V-characteristic signal to change the degree of excitation of the control means in accordance with the amplitude of the transposed output signal.

12. A control system as defined in claim 3 wherein the first and second valve means of the transposing means are first and second PNP transistors having a common connection between the emitters and having the control signal introduced at the base of the first transistor and the signal at the base of the second transistor interrelated with the current flowing in the first transistor to produce the complementary impedance characteristics at the collectors of the first and second transistors, and the means responsive to the impedance characteristics of the first and second valve means are two diodes having their cathodes connected respectively to the collectors of the first and second transistors and having a common connection between their anodes to produce the output signal at the common connection.

13. The control signal as defined in claim 6 wherein the first and second valve means of the relay control means are first and second PNP transistors having the control signals applied to the base of the first transistor with the input to the base of the second transistor taken from the collector of the first transistor and dependent upon the current flowing through the first transistor to control the current flowing through the second transistor to control the relay means.

14. The combination of claim 4 wherein the means for producing the signal having a sloping characteristic includes a light responsive element.

15. The combination of claim 4 wherein the means for producing the signal having a sloping characteristic includes first and second photosensitive means interconnected in a differential arrangememnt.

16. In combination for use with a movable medium, a control system for maintaining the tension in the movable medium at a desired value, including, control means operatively coupled to the medium for exerting a driving force on the movable medium in first and second opposite directions in accordance with the direction and the degree of excitation of the control means, oscillator means for producing a constant amplitude signal having a particular phase relationship, differential transformer means responsive to the oscillator means and to the tension in the movable medium for producing an output signal having an amplitude in accordance with the tension in the movable medium and having an in-phase relationship with the signal of the oscillator means when the tension in the movable medium is to one side of the desired value and an out-of-phase relationship with the signal of the oscillator means when the tension in the movable medium is to the other side of the desired value, phase detector means including four diodes in a bridge circuit responsive to the output signal from the differential transformer and to the signal from the oscillator means for producing a control signal having values on one side of a particular value for an in-phase relationship between the signals from the oscillator means and the differential transformer means and having values of the control signal on the other side of the particular value for an out-of-phase relationship between the signals from the oscillator means and the differential transformer means, and means responsive to the control signals on one side of the particular value to control the force exerted by the control means on the movable means in the first direction and responsive to the control signals on the other side of the particular value to control the force exerted by the control means in the second opposite direction.

References Cited by the Examiner

UNITED STATES PATENTS

| | | | |
|---|---|---|---|
| 1,969,536 | 8/1934 | Winne. | |
| 2,586,076 | 2/1952 | Nichols | 318—6 |
| 2,977,517 | 3/1961 | Baybick | 318—7 |
| 2,985,396 | 5/1961 | Johnson | 318—7 X |
| 3,092,764 | 6/1963 | Cooper | 318—6 |

ORIS L. RADER, *Primary Examiner.*

T. LYNCH, *Assistant Examiner.*